United States Patent [19]

Schaum et al.

[11] 3,871,971

[45] Mar. 18, 1975

[54] EXTRACTIVE RECOVERY OF A MANGANESE ACETATE CATALYST FROM RESIDUE RECOVERED FROM DISTILLATION OF AN ACETIC ACID FEED PRODUCED BY THE OXIDATION OF ACETALDEHYDE

[75] Inventors: Helmut Schaum, Bad Oden/Taunus; Helmut Gossel, Frankfurt/Main, both of Germany

[73] Assignee: Hoechst Aktiengesellschaft, Frankfurt/Main, Germany

[22] Filed: Oct. 26, 1972

[21] Appl. No.: 301,175

[30] Foreign Application Priority Data
Oct. 28, 1971   Germany........................... 2153767

[52] U.S. Cl. ............................. 203/43, 260/530 R
[51] Int. Cl. ............................................. B01d 11/00
[58] Field of Search....... 203/43; 260/530 R, 530 N, 260/541; 252/471, 431 R, 431 C, 431 N, 431 P, 431 L; 423/49

[56] References Cited

UNITED STATES PATENTS

| | | | |
|---|---|---|---|
| 2,169,369 | 8/1939 | Osterloh et al. | 260/530 R |
| 2,314,385 | 3/1943 | Bludworth | 260/530 |
| 2,333,756 | 11/1943 | Wentworth | 260/541 |
| 2,916,422 | 12/1959 | Elce et al. | 260/530 R |
| 3,336,379 | 8/1967 | Sitaud et al. | 260/530 R |
| 3,493,609 | 2/1970 | Kronig et al. | 260/541 |

FOREIGN PATENTS OR APPLICATIONS 367,863   2/1932   United Kingdom............. 260/530

*Primary Examiner*—A. Louis Monacell
*Assistant Examiner*—Frank Sever
*Attorney, Agent, or Firm*—Curtis, Morris & Safford

[57] ABSTRACT

Process for the recovery of a manganese acetate catalyst, used in the preparation of acetic acid by oxydation of acetaldehyde, through extraction of the residue occurring in the distillative acetic acid working-up with water in the presence of organic solvent immiscible with water.

3 Claims, 1 Drawing Figure

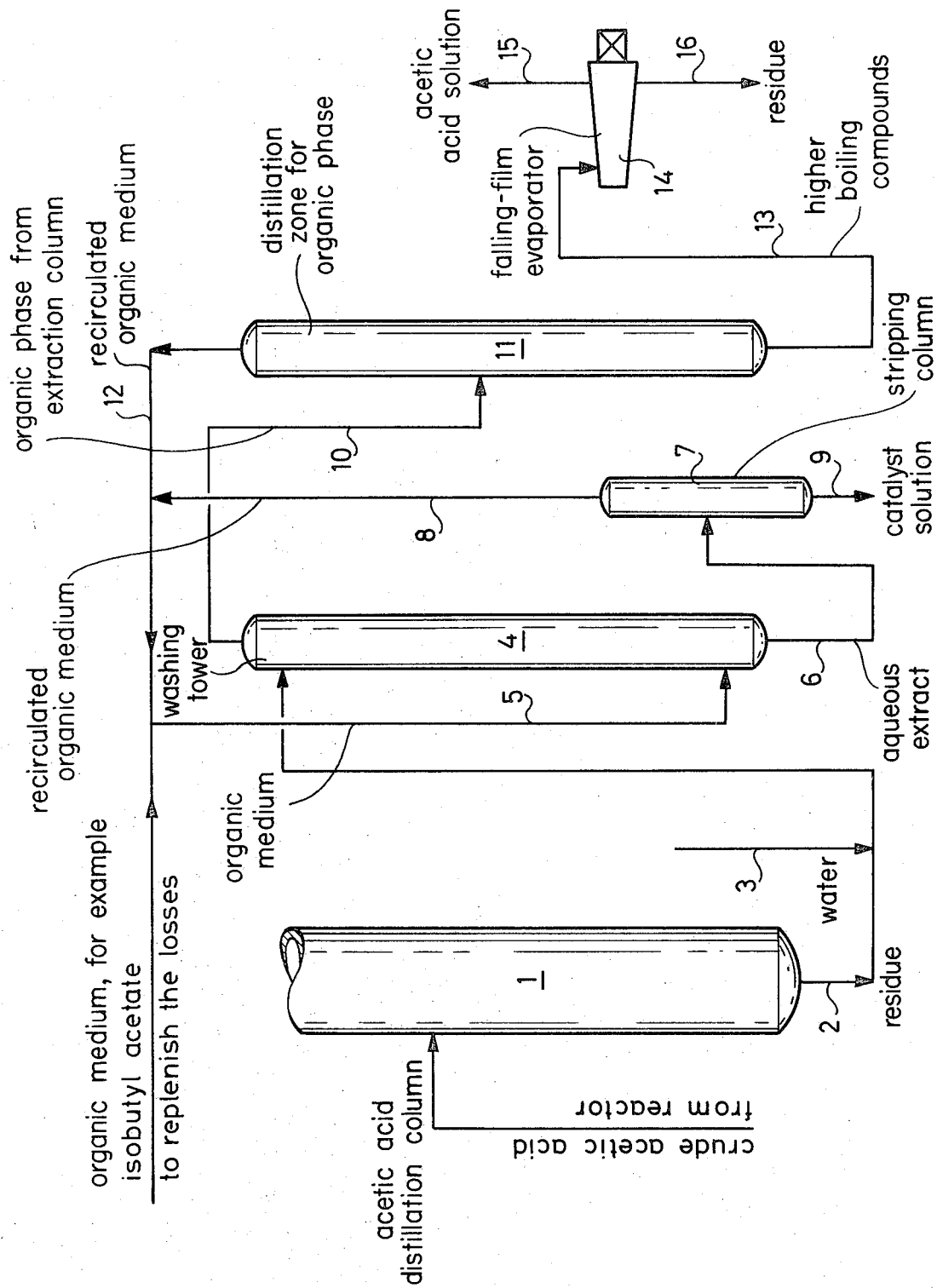

EXTRACTIVE RECOVERY OF A MANGANESE ACETATE CATALYST FROM RESIDUE RECOVERED FROM DISTILLATION OF AN ACETIC ACID FEED PRODUCED BY THE OXIDATION OF ACETALDEHYDE

The present invention relates to a process for the recovery of a manganese acetate catalyst.

When producing acetic acid technically by catalytic oxydation of acetic aldehyde, using manganese acetate as a catalyst, the manganese acetate is obtained as a sump, produced when crude acetic acid is distilled in combination with high-boiling compounds, such as ethylidene diacetate, and residual acetic acid. This fluid residue containing manganese acetate is no longer applicable as a catalyst; when using a mixture of this kind the reaction ceases after a short time. Up to now attempts have not been successful in recovering this manganese acetate economically in such a condition that it can be used again as a catalyst. For that reason it is disposed together with the high-boiling organic components of the sump. As a result of the constantly increasing obligations because of legal regulations for preventing the pollution of air and water the diposal of this residue brings about very high costs.

A process for the recovery of the manganese acetate catalyst used in the preparation of acetic acid by oxydation of acetaldehyde has now been found wherein the residue, which consists principally of acetic acid, manganese acetate, and high-boiling by-products, and which occurs with the working-up by distillation of the acetic acid, is extracted with water in the presence of an organic medium which dissolves the high-boiling by-products easily and which is immiscible with water.

In this process the organic compounds pass into the organic phase and the manganese acetate into the aqueous phase. Since, on account of the process, acetic acid is still present, the organic medium must possess the property that it can be easily separated from the aqueous phase in spite of the presence of acetic acid. As organic medium, for example, isobutyl acetate fulfils this prerequisition. The organic medium is recovered subsequently by distillation and used again as extraction agent for the organic impurities. The acetic acid should be available preferably in the aqueous phase which can be used again directly with the manganese acetate contained therein as catalyst solution in the reaction.

With this process, which can be carried out batchwise as well as continuously, it is possible to recover the catalyst practically quantitatively and in fact in such a quality that it can be used in the reaction. An enriching of disturbing impurities was not observed even in the course of a longer time.

The fact that the aqueous manganese acetate solution regained by this process can be used successfully as a catalyst is surprising in that the original catalyst residue is ineffective catalytically without this extractive treatment.

The continuous form of carrying out the process of the invention will now be described in further detail and by way of example with reference to the accompanying drawing.

The aqueous residue occuring in the first column 1 as sump of the crude acetic acid distillation is discharged through conduit 2, water is added by conduit 3 and the mixture passes into the upper part of the washing tower 4; the organic medium flows from below by conduit 5. The separating aqueous layer passes by conduit 6 into a small stripping column 7, which serves to recover the organic medium contained in it in small quantities, which is recirculated by conduit 8 into the washing column and used again. The sump of the stripping column 7 is recirculated directly as catalyst solution by conduit 9 to the acetic acid reactor. The organic phase which is separated at the upper end of the washing tower 4 is passed by conduit 10 into the column 11, where the organic extraction medium is recovered as distillate, which can be used again via conduit 12. The sump product of column 11 is passed by conduit 13 into a falling-film evaporator 14, where the acetic acid still contained in it is recovered as diluted solution. It is discharged by conduit 15, while the residue is removed by conduit and rejected.

The following examples illustrate the invention.

Example 1

350 kg/h of the residue occurring in column 1 as sump are taken off by conduit 2, and mixed with 350 kg/h of water by conduit 3. This mixture is passed into the upper part of the washing tower 4. From below 700 kg/h of isobutyl acetate flow up by conduit 5. The separating aqueous layer (311 kg/h) is passed by conduit 6 into the stripping column 7, in which 303 kg/h of aqueous manganese acetate solution are recovered as sump, which still contains acetic acid. This solution is recirculated by conduit 9 as catalyst solution for the preparation of acetic acid.

When using the catalyst recovered by this process the acetic acid reaction corresponds in every respect to the reaction carried out with fresh catalyst. Especially the yield is equally high. The organic layer ( 1,089 kg/h ) separating at the upper end of the washing tower 4 is passed by conduit 10 into the column 11, where 692 kg/h of isobutyl acetate are recovered as distillate. The sump product of the column 11 (397 kg/h) is separated in the falling-film evaporator 14 in 332 kg/h of aqueous acetic solution and 65 kg/h of residue. The latter is rejected.

Example 2

300 g of the catalyst residue and originating from a continuous acetic acid production which contains (according to analysis 27.8 g, corresp. to 9.3 percent manganese acetate) are agitated with 300 g of water and 215 g of isobutyl acetate. After the separation of both phases are obtained:

1. 329 g of an organic layer, which contains 24.0 percent acetic acid and 0.33 g, corresp. to 0.1 percent of manganese acetate (that corresponds to 1.2 percent manganese acetate calculated on the initial amount). The remainder consists of isobutyl acetate, high-boiling compounds and a small quantity of water.
2. 474 g of an aqueous layer, which contains 34 percent acetic acid and 27.3 g, corresp. to 5.8 percent manganese acetate (which corresponds to 98.4 percent manganese acetate calculated on the initial amount). The remainder is water and a small quantity of isobutylacetate.

The aqueous layer is passed without further working-up directly as catalyst solution into the acetic acid preparation. In so doing it is ascertained that the acetic acid reaction, with the use of a catalyst recovered as in this process, corresponds in every aspect to the reaction when using a fresh catalyst. In particular the yield is equally high.

From the organic layer the isobutyl acetate is recovered as well as the acetic acid by distillation. The remaining tarry residue is rejected.

Example 3

400 g of catalyst residue, which contains 69.8 percent acetic acid and 11.6 percent manganese acetate, are mixed with 400 g of water and 250 g of isopropyl acetate and agitated. The organic layer (459 g) contains 27.1 percent acetic acid and the aqueous layer (584 g) contains 26.9 percent acetic acid and 8.14 percent manganese acetate; that is 100 percent of the manganese acetate used. The aqueous layer is passed without further working-up directly as catalyst solution into the acetic acid preparation.

In so doing it is ascertained that the acetic acid reaction, when using the catalyst recovered by this process, corresponds in every respect to the reaction when using a fresh catalyst. In particular the yield is equally high.

From the organic layer the isopropyl acetate as well as the acetic acid is recovered by distillation. The remaining tarry residue is rejected.

Example 4

200 g of catalyst residue, which contains 84.7 percent by weight acetic acid and 6.5 percent by weight manganese acetate, are mixed with 200 g of water and 140 g of n-butyl acetate and shaken. The organic layer (222 g) contains 25.8 percent by weight acetic acid and the aqueous layer (317 g) contains 34.2 percent by weight acetic acid and 3.95 percent by weight manganese acetate; that is 96.3 percent by weight of the manganese acetate used.

The aqueous layer is apssed without further working-up directly into the acetic acid preparation as catalyst solution.

In so doing it is ascertained, that the acetic acid reaction, when using the catalyst recovered by this process, corresponds in every respect to the reaction when using fresh catalyst. In particular the yield is equally high.

From the organic layer the n-butyl acetate is recovered by distillation as well as the acetic acid. The remaining tarry residue is rejected.

Example 5

200 g of catalyst residue, which contains 94.2 percent by weight of acetic acid and 2.36 percent by weight of manganese acetate, are mixed with 200 g of water and 140 g of toluene and shaken. The organic layer (160 g) contains 6.6 percent by weight acetic acid and the aqueous layer (380 g) contains 42.5 percent by weight acetic acid and 1.24 percent by weight manganese acetate; 42.5 percent by weight acetic acid and 1.24 percent by weight manganese acetate; that is 99.9 percent of the manganese acetate used.

The aqueous layer is passed directly without further working-up as catalyst solution into the acetic acid preparation.

In doing so it is ascertained that the acetic acid reaction, when using the catalyst recovered by this process, corresponds in every respect to the reaction when using fresh catalyst. In particular the yield is equally high.

From the organic layer the toluene as well as the acetic acid is recovered by distillation. The remaining tarry residue is rejected.

We claim:

1. A process for the manufacture of acetic acid comprising the steps of:
   1. oxidizing acetaldehyde in a mixture containing a manganese acetate catalyst and thereby forming a mixture of acetic acid, acetaldehyde, manganese acetate and other higher and lower boiling components;
   2. passing the mixture formed in 1 to a distillation zone and removing therefrom an overhead product comprising acetaldehyde, acetic acid and lower boiling components and a bottoms stream comprising manganese acetate and higher boiling components;
   3. contacting said bottoms stream, in a liquid-liquid extraction zone with water and with a substantially water immiscible, organic liquid in which said higher boiling components are soluble, and thereby extracting the said manganese acetate in water solution and extracting said higher boiling components in said organic liquid.

2. A process as claimed in claim 1, wherein the organic is selected from the group consisting of i-propyl acetate i-butyl acetate, n-butyl acetate and toluene.

3. A process as claimed in claim 1, wherein the aqueous manganese acetate solution which is formed is used again as the catalyst for preparing acetic acid.

* * * * *